(12) United States Patent
Kim et al.

(10) Patent No.: US 11,034,262 B2
(45) Date of Patent: Jun. 15, 2021

(54) SEAT CUSHION EXTENSION DEVICE

(71) Applicant: DAECHANG SEAT CO., LTD-DONGTAN, Gyeonggi-do (KR)

(72) Inventors: Jeong Soo Kim, Busan (KR); Chan Ki Cho, Gangwon-do (KR); Myung Soo Lee, Gyeonggi-do (KR)

(73) Assignee: DAECHANG SEAT CO., LTD, Gyeonggi-Do (KR)

( * ) Notice: Subject to any disclaimer, the term of this patent is extended or adjusted under 35 U.S.C. 154(b) by 0 days.

(21) Appl. No.: 16/642,303

(22) PCT Filed: Aug. 30, 2018

(86) PCT No.: PCT/KR2018/010080
§ 371 (c)(1),
(2) Date: Feb. 26, 2020

(87) PCT Pub. No.: WO2019/045496
PCT Pub. Date: Mar. 7, 2019

(65) Prior Publication Data
US 2020/0198500 A1 Jun. 25, 2020

(30) Foreign Application Priority Data
Aug. 30, 2017 (KR) .................. 10-2017-0109899

(51) Int. Cl.
*B60N 2/62* (2006.01)
*B60N 2/02* (2006.01)
(Continued)

(52) U.S. Cl.
CPC .......... *B60N 2/0284* (2013.01); *B60N 2/548* (2013.01); *B60N 2/919* (2018.02); *B60N 2002/952* (2018.02)

(58) Field of Classification Search
CPC ...... B60N 2/0284; B60N 2/548; B60N 2/919; B60N 2002/952
See application file for complete search history.

(56) References Cited

U.S. PATENT DOCUMENTS 7,571,964 B2 * 8/2009 Taniguchi .............. B60N 2/995
297/284.11 X
7,578,554 B2 * 8/2009 Lee .......................... B60N 2/62
297/284.11
(Continued)

FOREIGN PATENT DOCUMENTS

DE 10012800 C1 * 10/2001 .......... B60N 2/0284
KR 10-2003-0083144 A 10/2003
(Continued)

*Primary Examiner* — Rodney B White
(74) *Attorney, Agent, or Firm* — Fay Sharpe LLP

(57) ABSTRACT

A seat cushion extension device is provided which can slide a seat cushion via a single spring, and has high assembly efficiency and a low weight due to a simple structure. The seat cushion extension device includes: a base having first and second rack gears provided to face each other; a cushion part provided on an upper portion of the base to move forward/backward; a locking gear part combined with a shaft extending from the cushion part to the base and having a first gear provided to be engaged with the first and second rack gears; and a manipulation part combined with the cushion part to move forward/backward between the cushion part and the first gear, and having a protruding part provided on a lower surface thereof.

5 Claims, 8 Drawing Sheets

(51) Int. Cl.
*B60N 2/90* (2018.01)
*B60N 2/54* (2006.01)

(56) References Cited

U.S. PATENT DOCUMENTS

| | | | | |
|---|---|---|---|---|
| 7,669,929 B2* | 3/2010 | Simon | ............... | B60N 2/0284 |
| | | | | 297/284.11 |
| 7,874,621 B2* | 1/2011 | Gumbrich | ............ | B60N 2/0284 |
| | | | | 297/284.11 X |
| 7,909,401 B2* | 3/2011 | Hofmann | ............. | B60N 2/0284 |
| | | | | 297/284.11 |
| 7,997,648 B2* | 8/2011 | Becker | ................. | B60N 2/0284 |
| | | | | 297/284.11 |
| 8,579,373 B2* | 11/2013 | Pradier | .................... | B60N 2/62 |
| | | | | 297/284.11 |
| 8,684,459 B2* | 4/2014 | Teufel | ................. | B60N 2/0284 |
| | | | | 297/284.11 |
| 8,888,181 B2* | 11/2014 | Perraut | ................ | B60N 2/1803 |
| | | | | 297/284.11 |
| 9,278,636 B2* | 3/2016 | Duncan | .................... | B60N 2/62 |
| 9,751,429 B2* | 9/2017 | Planson | ............... | B60N 2/0232 |
| 10,773,624 B2* | 9/2020 | Morrow | ............... | B60N 2/0284 |
| 2009/0091172 A1* | 4/2009 | Kim | ..................... | B60N 2/0284 |
| | | | | 297/337 |
| 2016/0339805 A1* | 11/2016 | Kim | ..................... | A47C 7/5062 |

FOREIGN PATENT DOCUMENTS

| | | | |
|---|---|---|---|
| KR | 10-2010-0033580 A | 3/2010 |
| KR | 10-2011-0016566 A | 2/2011 |
| KR | 10-1593817 B1 | 2/2016 |
| KR | 10-1685927 B1 | 12/2016 |
| KR | 10-2018-0045522 A | 5/2018 |

\* cited by examiner

[Fig. 1]
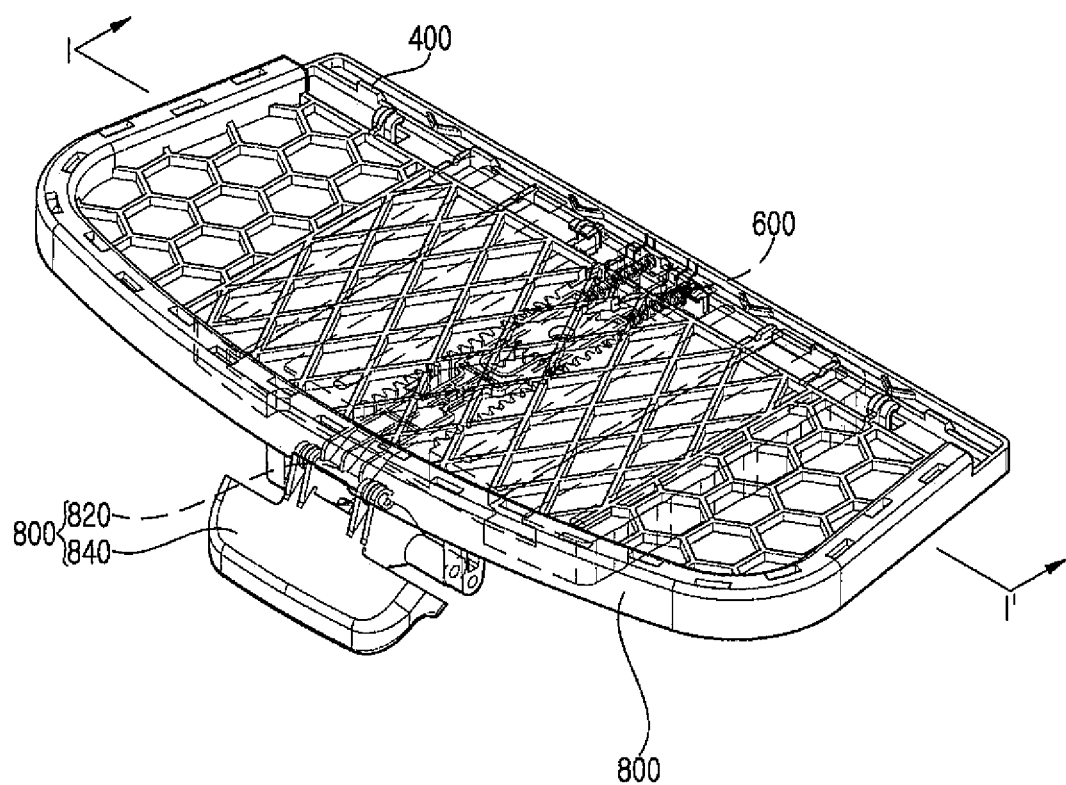

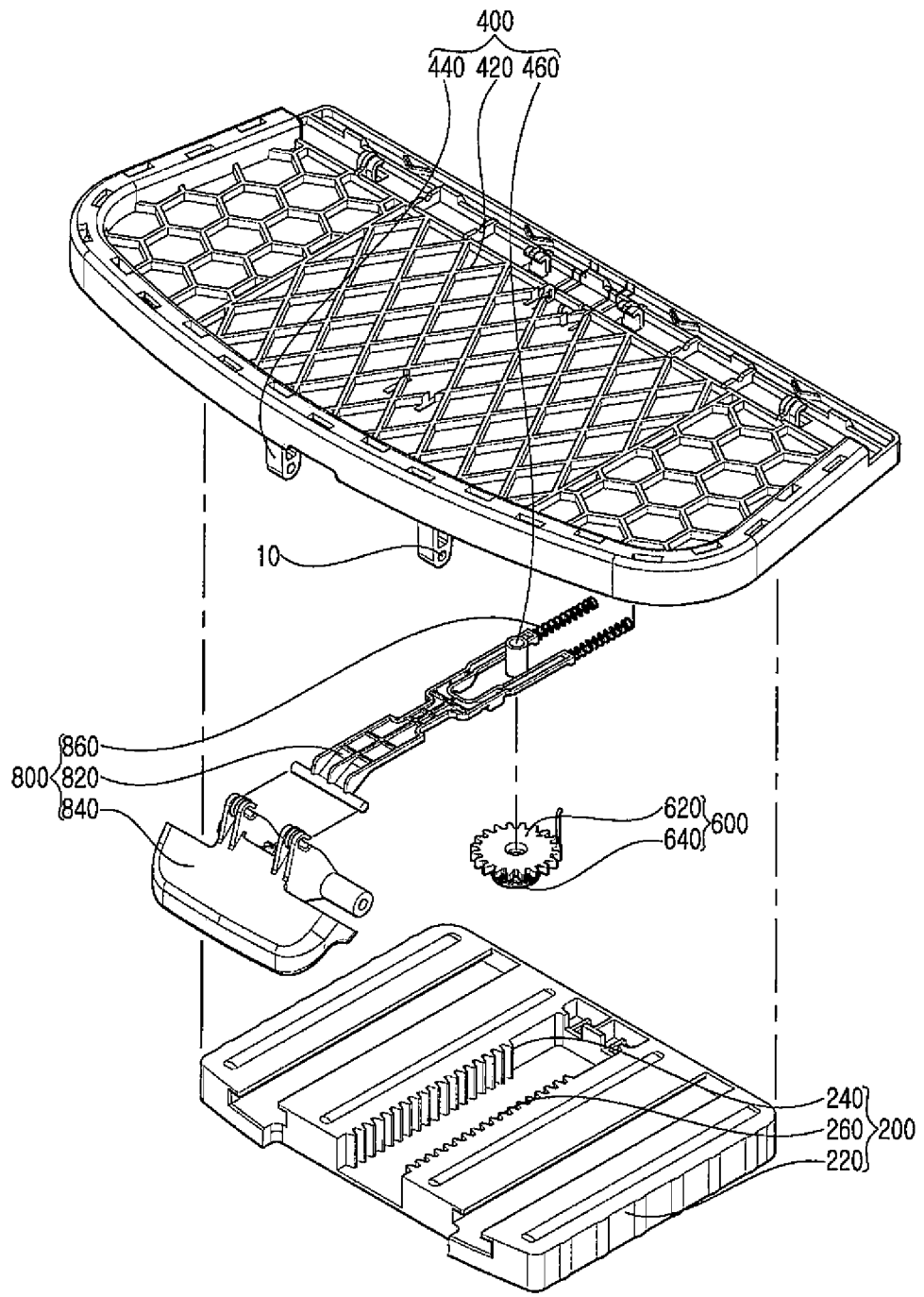
[Fig. 2]

[Fig. 3]
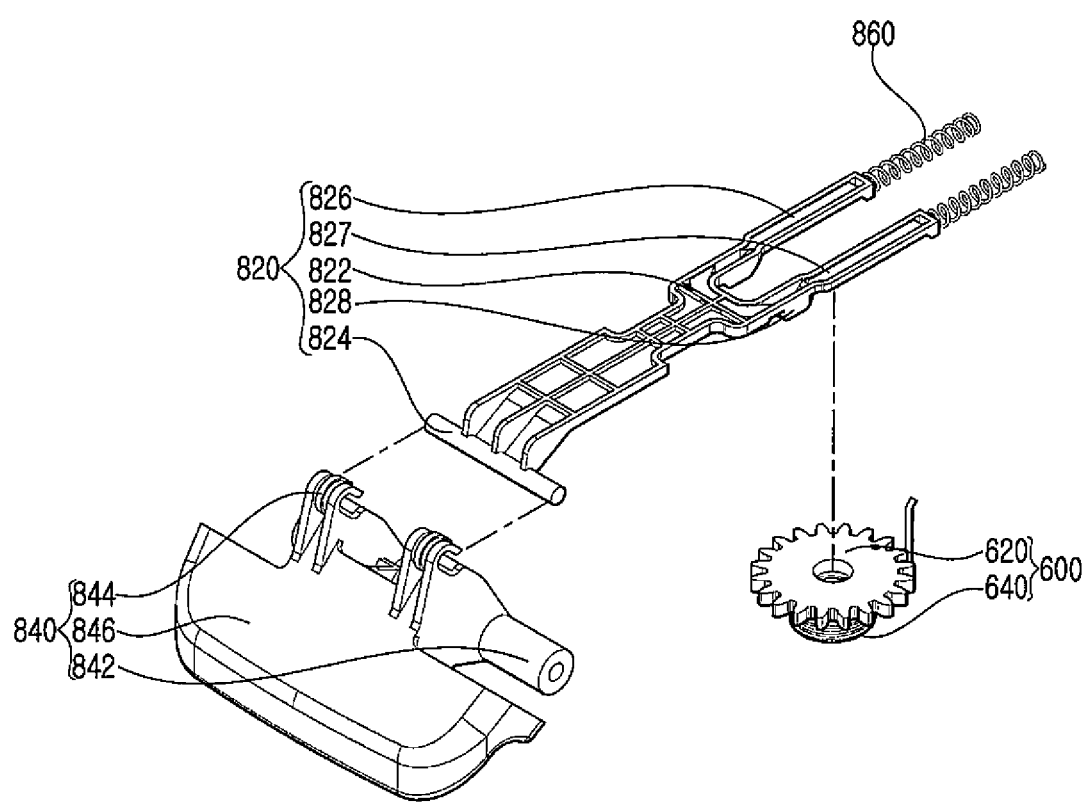

[Fig. 4]
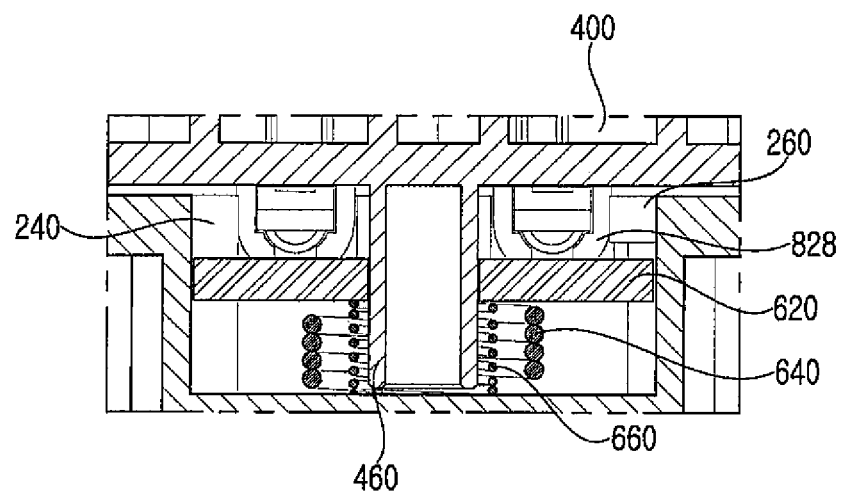

[Fig. 5]
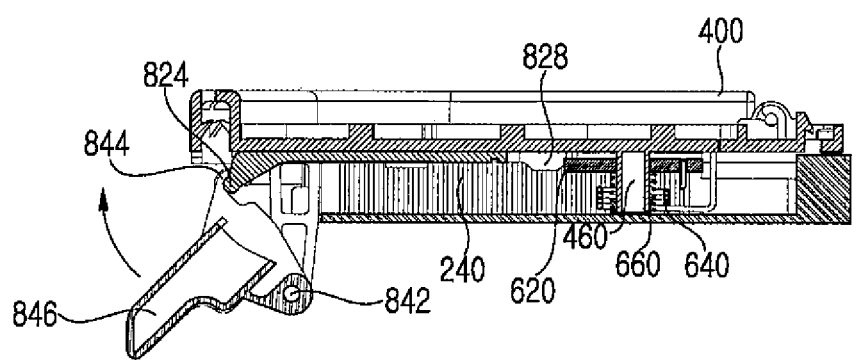
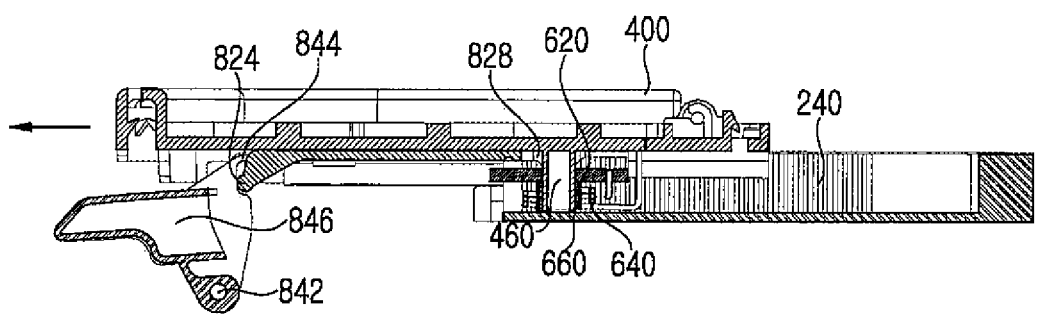

[Fig. 6]
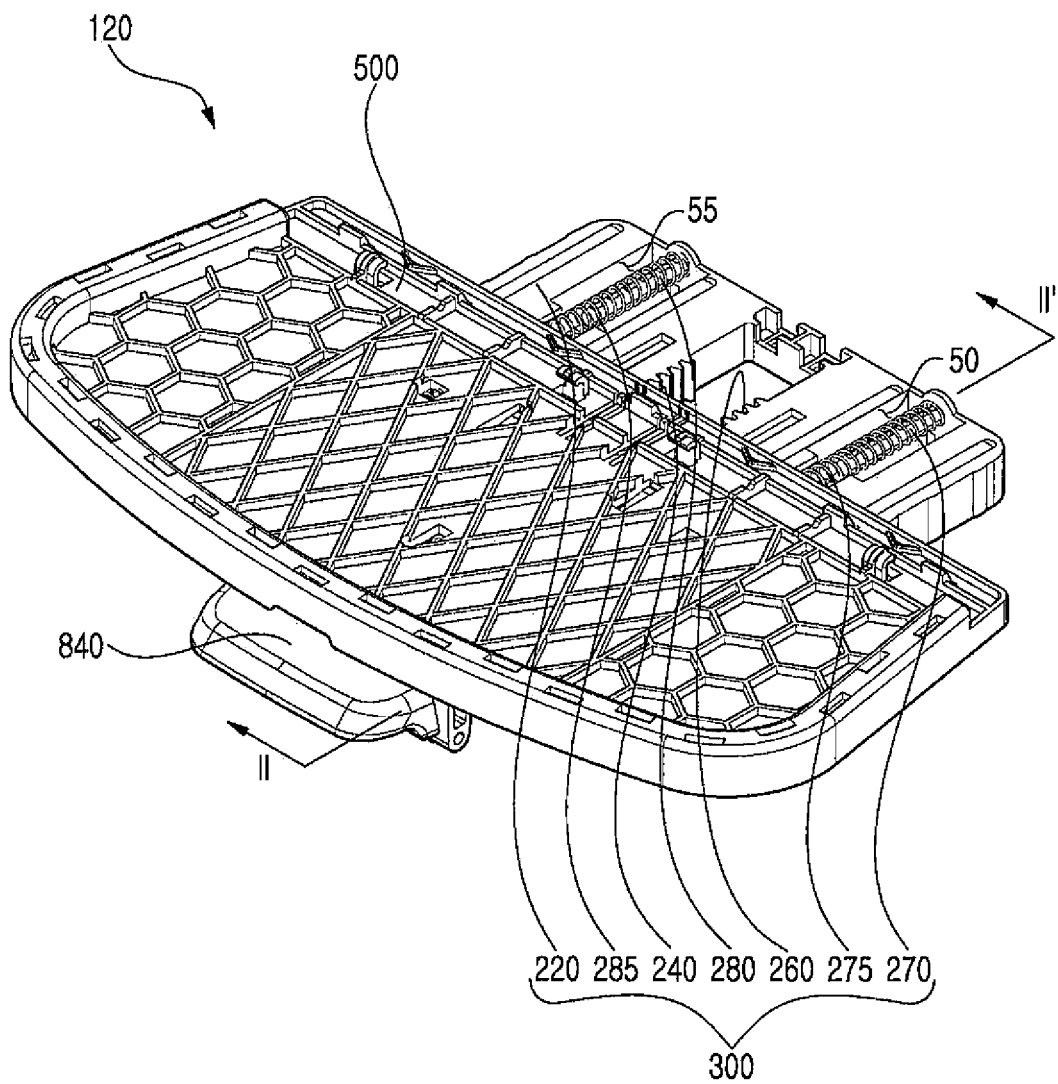

[Fig. 7]
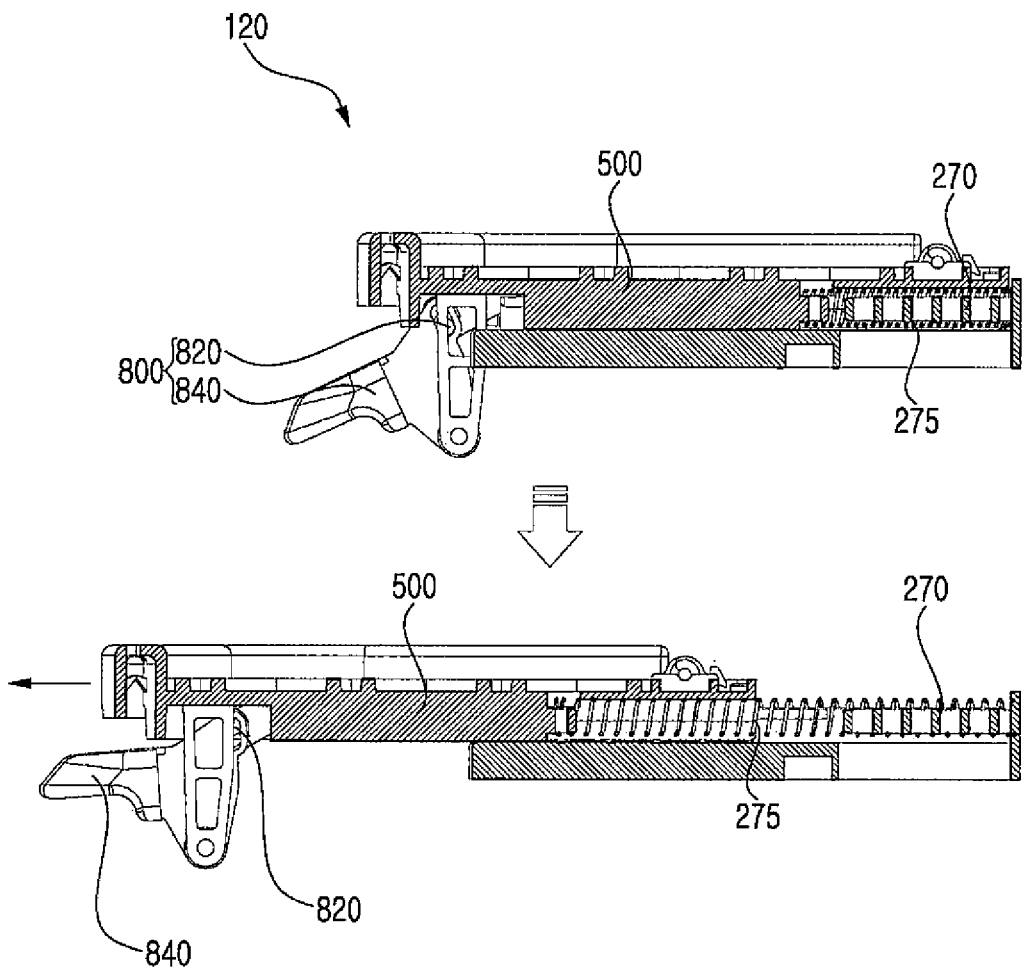

[Fig. 8]
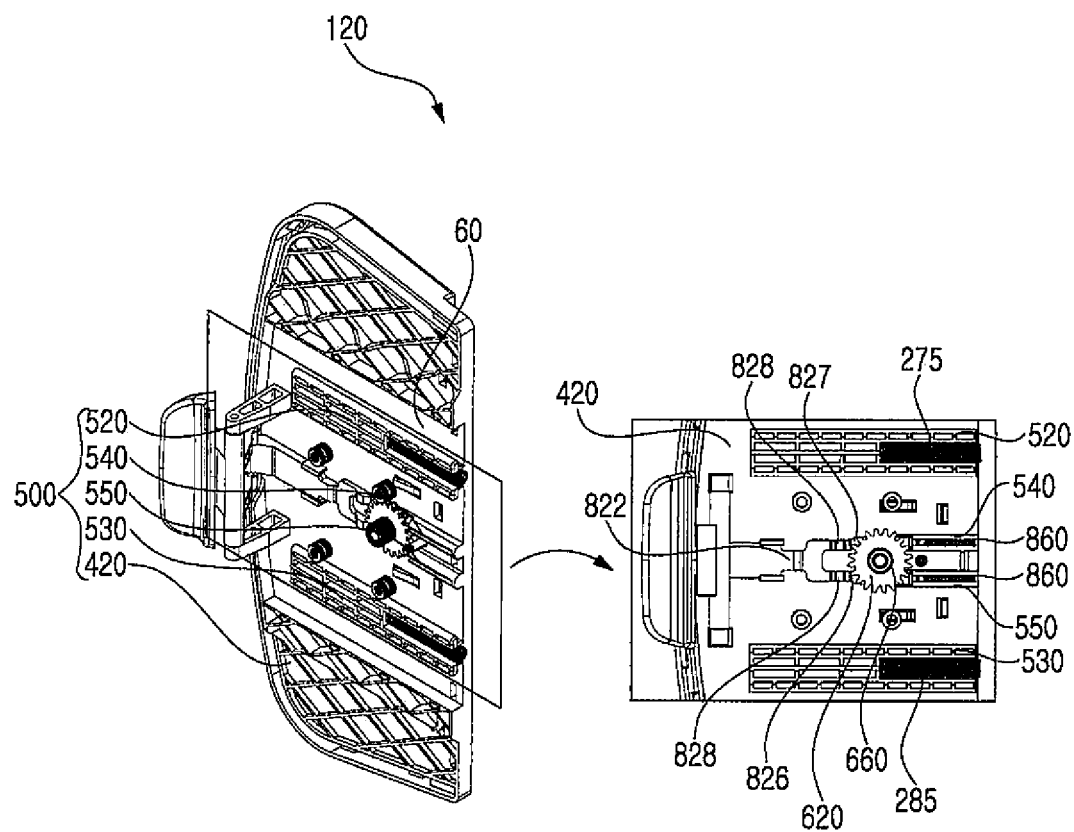

SEAT CUSHION EXTENSION DEVICE

CROSS-REFERENCE TO RELATED APPLICATION

This Application is a Section 371 National Stage Application of International Application No. PCT/KR2018/010080, filed Aug. 30, 2018, the contents of which is hereby incorporated by reference in its entirety.

TECHNICAL FIELD

The present invention relates generally to a seat cushion extension device. More particularly, the present invention relates to a seat cushion extension device, whereby the forward and backward length adjustment of a seat cushion installed inside a vehicle is efficiently performed.

BACKGROUND ART

Unless otherwise indicated herein, the contents described in this identification are not prior art to the claims of this application, and the description in this identification is not admitted to be prior art.

In general, a seat cushion extension device is mounted to the inside of the vehicle so as to support the lower body of the user thereunder, and is manufactured such that a portion of a seat cushion extends forward for the convenience of users having a variety of physical conditions.

Recently, the use of a motor and a planetary gear installed inside a seat cushion is avoided to reduce power consumption, manufacturing cost and weight of the seat cushion extension device, and techniques are being developed that use springs as a power for the movement of the seat cushion.

In this regard, a seat cushion extension device using a plurality of coil springs is disclosed in Korean Patent No. 10-1516224, and a seat cushion extension device using a motor is disclosed in Korean Patent No. 10-1034310.

However, the seat cushion extension devices of the existing inventions are heavy in weight due to the use of a motor or a plurality of springs, and are disadvantageous in that the sliding of the seat cushion is difficult when an elastic force of any one of the plurality of springs deteriorates.

DISCLOSURE

Technical Problem

The present invention provides a seat cushion extension device which can slide a seat cushion via a single spring, and has high assembly efficiency and a low weight due to a simple structure.

In addition, the technical problems to be solved by the present invention are not limited to the technical problems as mentioned above, and another technical problem, which is not mentioned, could be clearly understood by those having ordinary skill in the art to which the present invention pertains based on the descriptions below.

Technical Solution

A seat cushion extension device according to an embodiment of the present disclosure includes: a base having first and second rack gears provided to face each other; a cushion part provided on an upper portion of the base to move forward/backward; a locking gear part combined with a shaft extending from the cushion part to the base and having a first gear provided to be engaged with the first and second rack gears; and a manipulation part combined with the cushion part to move forward/backward between the cushion part and the first gear, and having a protruding part provided on a lower surface thereof, wherein when the manipulation part is moved backward such that the protruding part lowers the first gear, the first gear is disengaged from the second rack gear, and the cushion part is changed to be slidable.

In addition, the locking gear part may further include a torsion spring generating a rotational elastic force by being combined with the first gear, wherein when the first gear is disengaged from the second rack gear, the first gear may be moved forward while being rotated clockwise by the rotational elastic force of the torsion spring.

Furthermore, the first rack gear may be configured such that a thickness of the first rack gear is greater than a thickness of the second rack gear, and an upper surface of each of the first and second rack gears may be located on the same horizontal line, wherein when the first gear is lowered and disengaged from the second rack gear, the cushion part may be moved forward, and when the cushion part is moved backward, the first gear may be rotated counterclockwise and the torsion spring may be transformed.

Additionally, the locking gear part may further include a coil spring provided in a shape of surrounding the shaft between the shaft and the torsion spring, the coil spring elastically resisting against the first gear when the first gear is lowered, wherein when the manipulation part is elastically moved forward and the protruding part is disengaged from the first gear, the first gear may be elastically moved upward, engaged with the first and second rack gears, and fix the cushion part.

The base may include springs, each of which is disposed in each of sliding grooves provided by being recessed downward in a shape of extending longitudinally forward/backward at opposite sides of the first and second rack gears, an end of a front of each of the springs being configured to be combined with the cushion part, wherein when the first gear is disengaged from the second rack gear, the cushion part may be moved forward by the springs.

Advantageous Effects

According to an embodiment of the disclosure in the present specification, the seat cushion extension device uses the rotational elastic force of the torsion spring as power to move the seat cushion, thereby decreasing electric power consumption inside a vehicle and weight of the seat cushion extension device.

In addition, the seat cushion extension device has a simple inner structure and a small number of the springs necessary for driving the device unlike an existing seat cushion extension device, thereby increasing manufacturing convenience and assembly efficiency.

Furthermore, unlike the existing seat cushion extension device in which the smooth movement of the seat cushion is difficult due to difference of an elastic force of each of a plurality of coil springs installed inside opposite sides of the extension device, the seat cushion extension device of the present disclosure allows the seat cushion to be moved forward by the elastic force of a single torsion spring, so the seat cushion can be stably moved.

In addition, since the effects of the present invention described above are to be naturally exerted by the configuration of the content described irrespective of whether or not the inventor recognizes such effects, the above-described effects are only a few effects according to the content described, and it should not be recognized that all the effects which are understood by the inventor or are actually described herein.

In addition, the effects of the present invention will be further understood by the entire description of the specification, and if those having ordinary knowledge in the technical field to which the description belongs recognize such effects in the present specification even if the effects are not described in explicit sentences, the effects will be recognized as being described in the present specification.

DESCRIPTION OF DRAWINGS

FIG. 1 is a perspective view of a seat cushion extension device according to an embodiment of the present disclosure.

FIGS. 2 and 3 are exploded perspective views of the seat cushion extension device of FIG. 1.

FIG. 4 is a sectional view taken along line I-I' of FIG. 1.

FIG. 5 shows sectional views illustrating the driving of the seat cushion extension device of FIG. 1.

FIG. 6 is a perspective view of a seat cushion extension device according to another embodiment of the present disclosure.

FIG. 7 shows sectional views taken along line II-II' of the seat cushion extension device of FIG. 6.

FIG. 8 is a perspective view of the seat cushion extension device illustrated in FIG. 6.

MODE FOR INVENTION

Hereinafter, the configuration, operation, and effects of a seat cushion extension device according to exemplary embodiments will be described with reference to the accompanying drawings. For reference, in the drawings below, each component is omitted or schematically illustrated for convenience and clarity, and the size of each component does not reflect the actual size. In addition, the same reference numerals throughout the specification will refer to the same components and reference numerals for the same components in the individual drawings will be omitted.

FIG. 1 is a perspective view of a seat cushion extension device according to an embodiment of the present disclosure.

FIGS. 2 and 3 are exploded perspective views of the seat cushion extension device of FIG. 1.

FIG. 4 is a sectional view taken along line I-I' of FIG. 1.

FIG. 5 shows sectional views illustrating the driving of the seat cushion extension device of FIG. 1.

As illustrated in FIG. 1, the seat cushion extension device 100 includes a base 200, a cushion part 400, a locking gear part 600, and a manipulation part 800.

According to the seat cushion extension device 100, the cushion part 400 is elastically moved forward by a user pulling the manipulation part 800 upward without having to use an electrically operated motor.

The base 200 includes a frame 220, a first rack gear 240, and a second rack gear 260.

The base 200 is configured to include the frame 220 formed in the shape of a plate, and the first and second rack gears 240 and 260 provided in the middle of the frame 220 such that teeth of each of the first and second rack gears face each other.

Sliding grooves are formed at upper ends of opposite sides of the frame 220, each of the sliding grooves being recessed by a predetermined distance downward, and the cushion part 400 is combined with the base 200 to be slidable forward or backward via the sliding grooves.

The first rack gear 240 is formed on an inner surface of a groove formed in the middle of the frame 220 so as to have thickness greater than thickness of the second rack gear 260, and the second rack gear 260 is formed on an inner surface of the groove to face the first rack gear 240 with a predetermined interval therebetween.

Each of upper surfaces of the first rack gear 240 and the second rack gear 260 is located on the same horizontal plane, and a lower surface of the second rack gear 260 is formed inside the groove to be spaced apart by a predetermined distance from the frame 220.

The cushion part 400 is combined with an upper portion of the base 200 to move forward or backward.

The cushion part 400 includes a cushion frame 420, block flanges 440, and a shaft 460.

The cushion frame 420 is formed in the shape of a plate and has sliding bars provided on a lower surface thereof, the sliding bars being combined with the sliding grooves, and a rim having a ring shape is formed on edges except for a rear of the cushion frame, the rim surrounding a predetermined space open at a lower portion thereof.

While each of the block flanges 440 is spaced apart by a predetermined interval from each other to opposite sides, a first end of the block flange is combined with an inner side of the rim located at a front of the cushion frame 420, and a second end thereof is formed to protrude downward, and through holes 10 are formed at lower ends of the block flanges by passing through opposite sides of the block flange.

While the base 200 and the cushion part 400 are combined with each other, the lower end of each of the block flanges 440 is formed to protrude toward a lower surface of the base 200, and each of the through holes 10 is located at a position lower than a position of the lower surface of the base 200.

While the base 200 and the cushion part 400 are combined with each other, a first end of the shaft 460 is combined with the lower surface of the cushion frame 420 and a second end of the shaft 460 vertically extends toward a space between the first and second rack gears 240 and 260 of the base 200.

While the base 200 and the cushion part 400 are combined with each other, the shaft 460 is configured to be adjacent to a rear of each of the base 200 and the cushion part 400, and is combined with the locking gear part 600 between the first and second rack gears 240 and 260.

The locking gear part 600 is provided between the base 200 and the cushion part 400, and the cushion part 400 is moved forward or the movement of the cushion part 400 is stopped by the driving of the manipulation part 800.

The locking gear part 600 includes a first gear 620 and a torsion spring 640.

The first gear 620 is rotatably combined with the shaft 460 by inserting a second end of the shaft 460 into a hole passing through a center of the first gear 620, and can slide upward or downward along the shaft 460.

A first end of the torsion spring 640 is combined with the lower surface of the cushion frame 420, and a second end of the torsion spring is combined with a lower surface of the first gear 620 while surrounding the shaft 460. Accordingly, the torsion spring is transformed according to clockwise or counterclockwise rotation of the first gear 620 and provides a rotational elastic force.

When the first gear 620 moves downward by a predetermined distance, the first gear is disengaged from the second rack gear 260 and is changed to a state of being capable of being rotated by the torsion spring 640.

When the first gear 620 is rotated clockwise by the elastic force of the torsion spring 640 while being in a state of being engaged with the first rack gear 240, the first gear 620 moves forward together with the cushion frame 420 along the first rack gear 240.

The manipulation part 800 is combined with the cushion part 400 to slide forward or rearward between the cushion part 400 and the first gear 620, and the cushion part 400 is moved forward or the movement of the cushion part 400 is stopped by the manipulation of the manipulation part.

The manipulation part 800 includes a rod 820, a lever 840, and springs 860.

The first end of the rod 820 is disposed forward, and the second end of the rod is formed to extend in the shape of a plate backward and to be divided into two opposite branches with a through groove of a middle of the two branches disposed therebetween.

While the base 200 and the cushion part 400 are combined with each other, the rod 820 moves forward or backward between the first and second rack gears 240 and 260, and the second end of the rod, which is divided into two branches, is disposed to extend backward from a position above the first gear 620 with the shaft 460 between the two branches.

While a first end of the lever 840 is rotatably combined with a shaft passing through each of the through holes 10 of the block flanges 440, a portion of an upper end of the lever is rotatably combined with a first end of the rod 820, and a second end of the rod extends backward and downward in the shape of a plate.

Accordingly, when the lever 840 moves by a predetermined angle upward between the block flanges 440 by rotating via the shaft, the portion of the upper end of the lever combined with the first end of the rod 820 moves the rod 820 by a predetermined distance backward.

A first end of each of the springs 860 is combined with the second end of the rod 820 with a predetermined interval between the springs, and a second end of the spring extends backward and is combined with the rear of the frame 220. Accordingly, the springs provide the elastic force to move the rod 820 forward.

Specifically, referring to FIG. 3, the rod 820 includes a rod frame 822, the shaft 824, a first spring support 826, a second spring support 827, and protruding parts 828.

A portion of a first end of the rod frame 822 located at a front thereof is formed in the shape of a plate, and a second end of the rod frame located at a rear thereof is formed to reduce by a predetermined distance toward the middle thereof at opposite surfaces thereof.

The shaft 824 is formed to extend in a cylindrical shape toward the opposite sides of the rod frame 822 at the first end thereof, and is inserted into the portion of the upper end of the lever 840, so that the lever 840 is rotatably combined with the shaft.

A first end of the first spring support 826 is combined with a first side of the second end of the rod frame 822, and a second end thereof extends backward and a portion of a center of the second end of the first spring support is inserted into any one of the springs 860.

A first end of the second spring support 827 is combined with a second side of the second end of the rod frame 822 to be spaced apart by a predetermined interval from the first end of the first spring support 827, and a second end of the second spring support extends backward and a portion of a center of the second end of the second spring support is inserted into the remaining one of the springs 860.

Accordingly, the second end of each of the first and second spring supports 826 and 827 pulls or pushes each of the springs 860 while being moved forward or backward by the driving of the lever 840.

Referring to FIG. 4, each of the protruding parts 828 extends by reducing downward from a lower surface of the first end of each of the first spring support 826 and the second spring support 827, and while the base 200 and the cushion part 400 are combined with each other, a position of a lower surface of each of the protruding parts 828 is similar to or under a position of the lower surface of the second rack gear 260.

Inclined surfaces are formed at a front and a rear of each of the protruding parts 828. When a second end of the lever 840 is moved upward by manipulation of a user and the rod 820 is moved backward by a predetermined distance, the inclined surfaces of each of the protruding parts 828 push the first gear 620 downward while passing by opposite sides of the shaft 460.

While a lower surface of each of the protruding parts 828 is in close contact with an upper surface of the first gear 620, a side of the first gear 620 is located under a lower surface of the second rack gear 260. Accordingly, the first gear 620 deviates from the second rack gear 260 and is changed to the state of being capable of rotating with the first rack gear 240.

While the base 200 and the cushion part 400 are combined with each other, the torsion spring 640 is combined with the first gear 620 at a lower portion thereof while being twisted, and when the first gear 620 is changed to the state of being capable of rotating, the first gear 620 is rotated clockwise by the rotational elastic force of the torsion spring 640.

When the first gear 620 rotates clockwise, the first gear 620 moves forward along the first rack gear 240, and the cushion part 400 also slides forward together with the first gear 620.

When a user lowers the first gear 620 via the lever 840 and pushes the cushion part 400 by a predetermined distance backward in the state in which the cushion part 400 moves forward, the first gear 620 moves backward by rotating counterclockwise in the state of being engaged with the first rack gear 240.

When the first gear 620 rotates counterclockwise, the torsion spring 640 is twisted and the rotational elastic force caused toward the first gear 620 by the second end of the torsion spring 640 is increased. The torsion spring generates resistance while the cushion part 400 moves backward, and the position of the cushion part 400 can be precisely adjusted while the cushion part 400 resists against the resistance.

Accordingly, the seat cushion extension device 100 can conveniently control the movement of the cushion part 400 only by the rotational elastic force of the torsion spring 640 without driving the motor, thereby reducing the power consumption of a vehicle and the weight of the seat cushion extension device.

Referring to FIGS. 3 to 5, the lever 840 includes lever shafts 842, fastening rings 844, and a manipulation plate 846, and the locking gear part 600 further includes a coil spring 660.

A first end of each of the lever shafts 842 is combined with each of opposite sides of the first end of the lever 840, and a second end of each of the lever shafts protrudes to each of the opposite sides in the shape of a cylinder. Accordingly, the lever shaft is rotatably combined with each of the block flanges 440.

A first end of the manipulation plate 846 is rotatably combined with the lever shaft 842, and a second end thereof is bent downward after extending by a predetermined distance to the front of the lever shaft 842 and extends in the shape of a plate by a predetermined distance.

Each of the fastening rings 844 is formed in the shape of a ring bent backward from an upper end of the manipulation plate 846, and is rotatably combined with each of opposite sides of the shaft 824 by surrounding each of the opposite sides of the shaft 824.

Accordingly, when a user moves the second end of the manipulation plate 846 by a predetermined distance upward, the lever 840 is rotated relative to the lever shaft 842, and the fastening ring 844 is moved backward, so the rod 820 is moved backward.

The coil spring 660 is formed to surround the shaft 460 between the shaft 460 and the torsion spring 640, and a first end of the coil spring located at a lower portion thereof is combined with a lower end portion of the shaft 460, and a second end thereof is combined with a lower surface of the first gear 620 by extending upward.

Each of the inclined surfaces located behind each of the protruding parts 828 gradually lowers the first gear 620 while coming into close contact with the upper surface of the first gear 620 when the rod 820 moves backward, and when the lower surface of the protruding part 828 is brought into close contact with the upper surface of the first gear 620, the first gear 620 is disengaged from the second rack gear 260 and is changed to the state of being capable of rotating.

While the second end of the manipulation plate 846 is moved up, a user can adjust the position of the cushion part 400, and when the user lets go of the manipulation plate 846 after adjusting the position of the cushion part 400, the manipulation plate 846 is lowered by the elastic force of the springs 860, and the protruding part 828 is moved forward.

While the protruding part 828 moves forward, the first gear 620 is moved to an initial position by being moved upward by the coil spring 660, is engaged with the first and second rack gears 240 and 260, and fixes a position of the cushion part 400, so the sliding of the cushion part 400 stops.

Accordingly, the seat cushion extension device 100 uses the rotational elastic force of the torsion spring 640 as power to move the cushion part 400, thereby saving electric power and decreasing weight of the device.

Furthermore, the seat cushion extension device 100 makes the installation of a motor or springs disposed inside an existing base 200 unnecessary only by the installation of the springs 860 and the torsion spring 640, thereby reducing manufacturing cost and weight of the device.

In addition, unlike the conventional seat cushion extension device, the seat cushion extension device 100 has a simple assembly structure, in which the manipulation part 800 is combined with the lower surface of the cushion part 400, and the first gear 620 is combined with the cushion part 400 via the shaft 460, thereby increasing manufacturing convenience and assembly efficiency.

FIG. 6 is a perspective view of a seat cushion extension device according to another embodiment of the present disclosure. FIG. 7 shows sectional views taken along line II-II' of the seat cushion extension device of FIG. 6. FIG. 8 is a perspective view of the seat cushion extension device illustrated in FIG. 6.

The seat cushion extension device 120 according to the embodiment is substantially the same as the seat cushion extension device 100 of FIGS. 1 to 5 except for first and second spring shafts 270 and 280, and first and second springs 275 and 285 of a base 300, first and second sliding parts 520 and 530, first and second insertion parts 540 and 550 of a cushion part 500, and a locking gear part 700. Accordingly, the substantially same components will use the same reference numerals and names and overlapping descriptions of the same components will be omitted.

As illustrated in FIGS. 6 to 8, the seat cushion extension device 120 includes the base 300, the cushion part 500, and the locking gear part 700.

The base 300 further includes the first spring shaft 270, the first spring 275, the second spring shaft 280, and the second spring 285.

The frame 220 is formed in the shape of a plate, and the first and second rack gears 240 and 260 are formed on each of inner surfaces facing the groove recessed downward in a shape of extending longitudinally forward and backward in the middle of the frame 220, the second rack gears 240 and 260 facing each other.

A first sliding groove 50 is formed between the first rack gear 240 and a first side of the frame 220, the first sliding groove being recessed toward a lower portion of the frame 220 in the shape of extending longitudinally forward/backward and communicating with an outside space at the front of the frame 220 by extending forward.

A second sliding groove 55 is formed between the second rack gear 260 and a second side of the frame 220, the second sliding groove being recessed toward the lower portion of the frame 220 in the shape of extending longitudinally forward/backward and communicating with the outside space at the front of the frame 220 by extending forward.

While the first spring shaft 270 is inserted into the first sliding groove 50, a first end of the first spring shaft 270 is combined with a rear portion of the frame 220 located inside the first sliding groove 50, and a second end of the first spring shaft 270 extends by a predetermined distance forward.

While the first spring 275 is inserted to the first sliding groove 50, a first end of the first spring 275 surrounds the first spring shaft 270, and a second end thereof extends forward. Accordingly, a portion of the first spring is inserted to the cushion part 500 and combined with the cushion part 500.

While the second spring shaft 280 is inserted to the second sliding groove 55, a first end of the second spring shaft is combined with a rear portion of the frame 220 located inside the second sliding groove 55, and a second end thereof extends by a predetermined distance forward.

While the second spring 285 is inserted to the second sliding groove 55, a first end of the second spring surrounds the second spring shaft 280, and a second end thereof extends forward. Accordingly, a portion of the second spring is inserted to the cushion part 500 and combined with the cushion part 500.

Accordingly, when the lever 840 is pulled forward and upward, the rod 820 is moved backward, the protruding part 828 moves the first gear 620 downward, the first gear 620 is disengaged from the second rack gear 260, and the cushion part 500 is slid forward by the elastic force of each of the first and second springs 275 and 285.

The cushion part 500 further includes the first sliding part 520, the second sliding part 530, the first insertion part 540, and the second insertion part 550.

A guide groove 60 is formed in the lower surface of the cushion frame 420 by being recessed in a rectangular shape upward from the middle of the lower surface of the cushion frame 420 and by extending and being open backward to communicate with the outside.

Each of the first sliding part 520, the second sliding part 530, the first insertion part 540, and the second insertion part 550 is formed to protrude downward from the lower surface of the cushion frame 420 located inside the guide groove 60.

A portion of an upper end of the frame 220 is combined with the cushion part 500 such that the frame 220 slides forward or backward while the portion of the upper end of the frame 220 is inserted to the guide groove 60.

A first end of the first sliding part 520 provided in a shape of a bar longitudinally formed forward/backward is combined with the lower surface of the cushion part 500 at a position corresponding to a direct upper portion of the first sliding groove 50, and a second end of the first sliding part 520 extends downward and portions of opposite surfaces of the second end thereof protrude to opposite sides to form protruding parts.

A first space is provided at a rear portion of the second end of the first sliding part 520 by being recessed by a predetermined distance upward from a lower surface of the first sliding part 520 such that a portion of a second end of the first spring 275 is inserted into the first space, and a first protrusion is provided at a front of the first space by protruding backward from the first sliding part 520, and is inserted to the second end of the first spring 275.

A first end of the second sliding part 530 provided in a shape of a bar longitudinally formed forward/backward is combined with the lower surface of the cushion part 500 at a position corresponding to a direct upper portion of the second sliding groove 55, and a second end of the second sliding part 530 extends downward and portions of opposite surfaces of the second end thereof protrude to opposite sides to form protruding parts.

A second space is provided at a rear portion of the second end of the second sliding part 530 by being recessed by a predetermined distance upward from a lower surface of the second sliding part 530 such that a portion of a second end of the second spring 285 is inserted into the second space, and a second protrusion is provided at a front of the second space by protruding backward from the second sliding part 530, and is inserted to the second end of the second spring 285.

While a portion of an upper end of the frame 220 is inserted to the guide groove 60, each of the first and second sliding parts 520 and 530 is inserted to and combined with each of the first and second sliding grooves 50 and 55 to be slidable forward and backward.

Referring to FIGS. 3 and 8, the first insertion part 540 protrudes in a shape of a bar extending longitudinally forward/backward downward from the lower surface of the cushion frame 420 at a position corresponding to a direct upper portion of the second spring support 827, and a portion of the second spring support 827 and the spring 860 are inserted to the inside of the first insertion part 540 at a front thereof.

The second spring support 827 is inserted into the first insertion part 540 to be slidable forward and backward, and while a rear portion of the spring 860 is inserted to the first insertion part 540 by a predetermined distance, the movement of the spring is stopped by a rear surface of the first insertion part 540.

The second insertion part 550 protrudes in a shape of a bar extending longitudinally forward/backward downward from the lower surface of the cushion frame 420 at a position corresponding to a direct upper portion of the first spring support 826, and a portion of the first spring support 826 and the spring 860 are inserted to the inside of the second insertion part 550 at a front thereof.

The first spring support 826 is inserted into the second insertion part 550 to be slidable forward and backward, and while a rear portion of the spring 860 is inserted to the second insertion part 550 by a predetermined distance, the movement of the spring is stopped by a rear surface of the second insertion part 550.

Accordingly, when the rod 820 is moved backward by the driving of the lever 840, the springs 860 are contracted, and the forward movement of the cushion part 500 is restricted, and when the driving of the lever 840 is stopped, the lever 840 is moved to an initial position by the elastic force of the springs 860.

In addition, the elastic force increasing while the springs 860 are contracted by the driving of the lever 840 restricts the driving of the lever 840. Accordingly, the rod 820 is prevented from being slid forward/backward by acceleration or stopping of the vehicle, and the lever 840 is precisely manipulated.

Although exemplary embodiments of the present invention are described with reference to the accompanying drawings, the exemplary embodiments of the present invention and configurations of the drawings have been disclosed for illustrative purposes and do not represent all of the technological spirit of the present invention. Accordingly, those skilled in the art will appreciate that various modifications, additions, and substitutions are possible without departing from the scope and spirit of the invention as disclosed in the accompanying claims. Therefore, the embodiments described above are to be understood in all respects as illustrative and not restrictive, and the scope of the present invention is indicated by the scope of the following claims rather than a detailed description. All changes or modifications derived from the meaning and scope of the claims and their equivalent concepts should be construed as being included in the scope of the present invention.

INDUSTRIAL APPLICABILITY

The seat cushion extension device allows the forward/backward length adjustment of the seat cushion installed inside a vehicle to be performed, and can be used in household or industrial vehicles.

The invention claimed is:

1. A seat cushion extension device, the extension device comprising:
   a base having first and second rack gears provided to face each other;
   a cushion part provided on an upper portion of the base to move forward and backward;
   a locking gear part combined with a shaft extending from the cushion part to the base and having a first gear provided to be engaged with the first and second rack gears; and
   a manipulation part combined with the cushion part to move forward and backward between the cushion part and the first gear, and having a protruding part provided on a lower surface thereof,
   wherein when the manipulation part is moved backward such that the protruding part lowers the first gear, the first gear is disengaged from the second rack gear, and the cushion part is allowed to slide.

2. The extension device of claim 1, wherein the locking gear part further comprises a torsion spring generating a rotational elastic force by being combined with the first gear, wherein when the first gear is disengaged from the second rack gear, the first gear is moved forward while being rotated clockwise by the rotational elastic force of the torsion spring.

3. The extension device of claim 2, wherein the first rack gear is configured such that a thickness of the first rack gear is greater than a thickness of the second rack gear, and an upper surface of each of the first and second rack gears is located on the same horizontal line, wherein when the first gear is lowered and disengaged from the second rack gear, the cushion part is moved forward, and when the cushion part is moved backward, the first gear is rotated counter-clockwise and the torsion spring is transformed.

4. The extension device of claim 3, wherein the locking gear part further comprises a coil spring surrounding the shaft and is disposed between the shaft and the torsion spring, the coil spring elastically resisting against the first gear when the first gear is lowered, wherein when the manipulation part is elastically moved forward and the protruding part is disengaged from the first gear, the first gear is elastically moved upward, engaged with the first and second rack gears, and fixes a position of the cushion part.

5. The extension device of claim 1, wherein the base comprises springs, each of which is disposed in sliding grooves recessed downwardly and extending longitudinally in a forward and backward direction at opposite sides of the first and second rack gears, a front end of each of the springs being attached to the cushion part, wherein when the first gear is disengaged from the second rack gear, the cushion part is moved forward by the springs.

\* \* \* \* \*